United States Patent [19]

Edvardsson

[11] Patent Number: 5,474,198
[45] Date of Patent: Dec. 12, 1995

[54] STILLPIPE SEALING DEVICE

[75] Inventor: Kurt O. Edvardsson, Linkoping, Sweden

[73] Assignee: Saab-Scania AB, Linkoping, Sweden

[21] Appl. No.: 70,183

[22] Filed: Jun. 2, 1993

Related U.S. Application Data

[63] Continuation-in-part of Ser. No. 920,342, Jul. 29, 1992, abandoned.

[51] Int. Cl.$^6$ .................................................. B65D 87/18
[52] U.S. Cl. ....................................... 220/216; 73/863.81
[58] Field of Search ................................... 220/216, 217, 220/219, 221, 222, 224, 225, 226, 227, 578, 580; 73/863.81, 863.85, 864.67, 305, 309, 322.5

[56] References Cited

U.S. PATENT DOCUMENTS

| | | |
|---|---|---|
| 2,096,358 | 3/1935 | Gautier . |
| 3,924,774 | 12/1975 | Donnelly . |
| 4,468,975 | 9/1984 | Sayles et al. ................. 73/863.81 |
| 4,641,139 | 2/1987 | Edvardsson . |
| 4,764,391 | 8/1988 | Wasserman et al. . |

*Primary Examiner*—Steven M. Pollard
*Attorney, Agent, or Firm*—Lowe, Price, LeBlanc & Becker

[57] ABSTRACT

A device in storage tanks with a floating roof and a vertical stillpipe with a number of openings distributed along the length of the same for reducing the outflow of volatile substances from stored products is described. The device comprises a floating body with at least one peripheral seal engaging the inner circumference of the stillpipe. The volume/weight relationship of the floating body is such that it floats in the product and encloses the product surface within its periphery. The floating body is designed so that the gas pressure inside the body is the same as the gas pressure within the stillpipe above the floating body. The body is so constructed that direct gauging with microwaves may be performed against the product surface through the inside of said stillpipe.

11 Claims, 3 Drawing Sheets

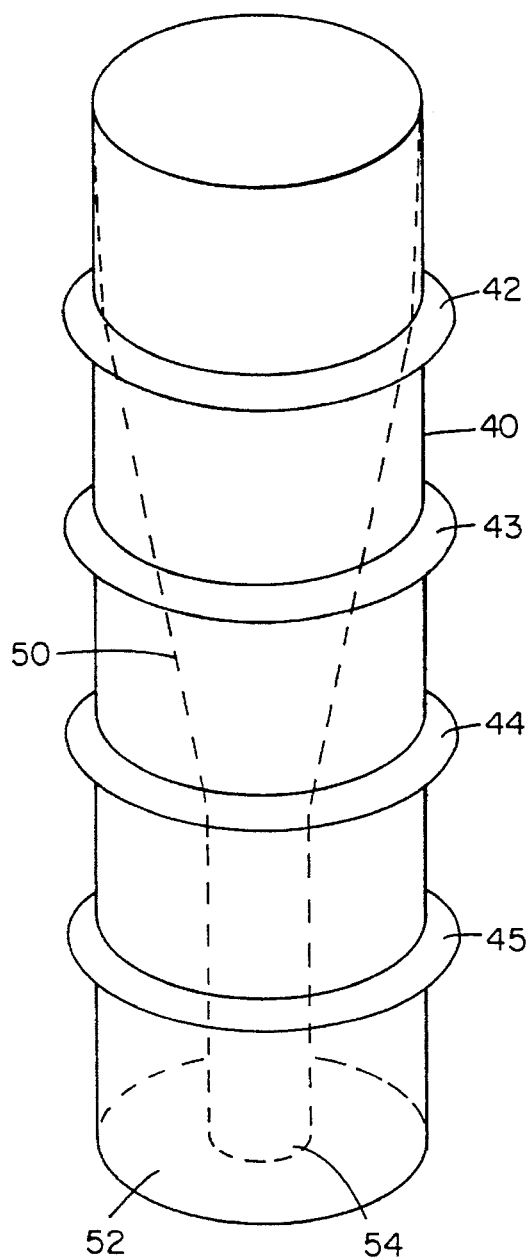
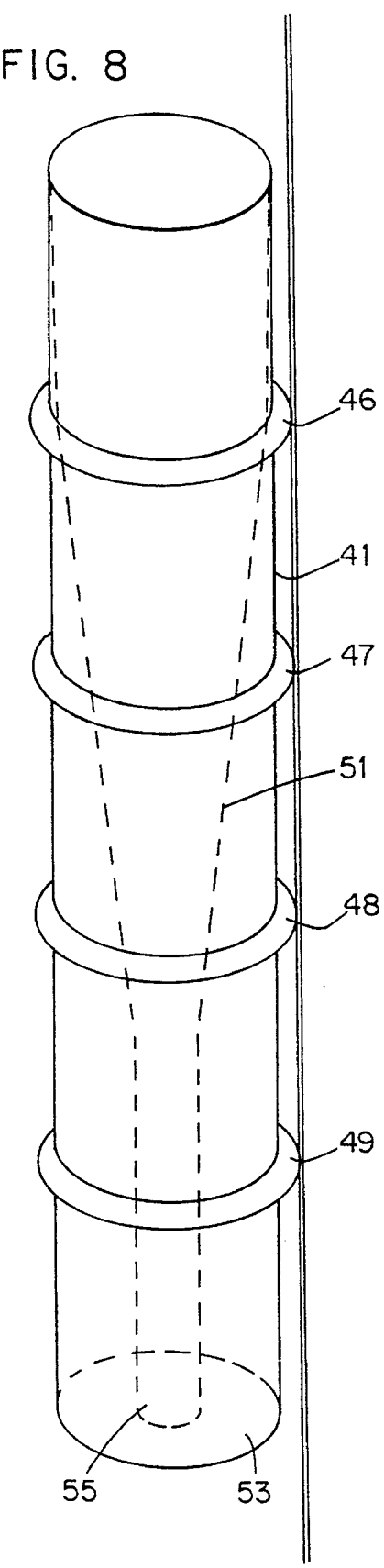

5,474,198

STILLPIPE SEALING DEVICE

RELATED APPLICATIONS

This application is a continuation-in-part of application Ser. No. 07/920,342 filed in the name of the inventor on Jul. 29, 1992, abandoned.

TECHNICAL FIELD

This invention relates to storage tanks with a floating roof and a stillpipe for storing products which contain volatile substances. The floating roof has a first opening designed to slide tightly along a vertical stillpipe which itself has a series of second openings distributed along its length to permit product flow for the products in the tank to the inside of the stillpipe. More particularly the invention relates to an improved sealing device movably mounted in the stillpipe to reduce the flow of volatile substances from the inside of the stillpipe to the atmosphere through the stillpipe openings which are located above the roof.

BACKGROUND ART

Tanks with a floating roof and a stillpipe are generally intended for storing relatively large volumes of petroleum products. The stillpipe is provided with a number of holes or slits along its length intended to insure that the level of the product is the same on the inside of the stillpipe as it is on the outside in the tank. The gauging of the level of the product was formerly performed by manual measuring with a measuring tape or with a float. Presently the gauging is generally performed with microwaves (radar) such as for instance in U.S. Pat. No. 4,641,139.

Present day environmental laws in numerous countries now impose rigid limits for pollution from substances that are harmful to the environment. This necessitates that tanks of different types must be designed in such a way that the outflow of volatile substances, such as by evaporation, must be limited.

DISCLOSURE OF THE INVENTION

According to the invention a sealing device in the stillpipe is characterized firstly in that it comprises a floating body provided with at least one outward seal designed to move or glide tightly against the inner circumference of the stillpipe. The volume/weight relationship of the floating body is such that the floating body, floating in the product encloses in its interior a portion of the product surface. The inside of the floating body communicates freely with the product through at least a third opening while a fourth opening to the inside of the stillpipe above the floating body is sufficient to allow the gas pressure in the inside of the floating body to communicate with the stillpipe above the floating body. The floating body is built to the extent necessary from material which allows direct gauging of the product level with microwaves.

It is thus an object of the invention to provide a device of the foregoing type which is simple in design and safe in utilization. The device should also permit level gauging of the product level with microwaves.

The device of the invention may be designed in various ways within the scope of the invention.

In one embodiment the floating body is formed like a pipe downwardly open through said third opening and on top provided with a cap from a material that is penetrable to microwaves and provided with a small fourth opening. This cap may be formed in the shape of a funnel. The pipe is suitably provided with a number of annular flexible seals spaced around the outer circumference of the pipe.

In one embodiment the pipe is designed with an inner constriction forming a substantially central channel with a relatively small cross section. The floating body is designed in such a way that while floating in said product the floating body presents the product surface below said channel. The constriction should be designed without sharp changes of diameter and when viewed in a longitudinal section comprise an hour-glass shape.

Considering the fact that the stillpipe when used for gauging with microwaves usually contains a downwardly diverging cone, the stillpipe thus in the upper end only shows a restricted cross-section automatically restorable to its original dimension. This design allows the cross-section of the floating body to be temporarily reduced so that it may be put down through the cross-section of the stillpipe which is only partially open.

In one suitable embodiment of the device according to the invention said pipe is deformable and the cap consists of a cupola or cone constructed from flexible material. A central frame is provided connected to the pipe and to the cupola by flexible links. The frame is provided, at its lower end, with centering guide elements. The flexible links in this case act like the corresponding links in an umbrella enabling the cupola to bend out of the pipe to their original dimensions.

In an alternative embodiment of the device the floating body is designed like a hollow sphere from flexible material substantially filling up the cross-section of the stillpipe. The volume/weight relationship of the floating body is such that the product surface within the body, when the floating body floats in the product, is located substantially at a symmetry plane through the center of the sphere.

BRIEF DESCRIPTION OF DRAWINGS

The invention is now described in more detail with reference being made to the accompanying figures wherein.

FIGS. 7 and 8 schematically illustrate in perspective a further embodiment of the device of the invention.

BEST MODE FOR CARRYING OUT THE INVENTION

Figure 1:
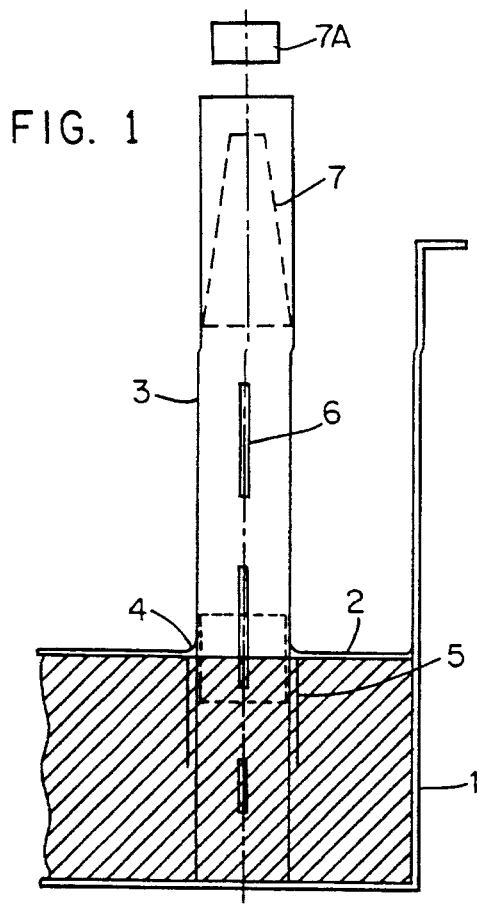
FIG. 1 is a schematic drawing showing a partial longitudinal section of a storage tank with a floating roof and a stillpipe.

Referring to FIG. 1 there is shown a tank 1 with a floating roof 2 and a stillpipe 3. A rubber sleeve 4 seals the stillpipe 3 against the roof 2. A jacket pipe 5 is attached to roof 2 and depends around the stillpipe 3. A number of elongated holes or slits 6 are spaced along the stillpipe 3. A conical insert 7 may be present in the stillpipe 3 intended to guide a microwave when gauging with such. A microwave source may be suitably disposed above or within the upper end of the stillpipe as shown at 7A.

Figure 2A:
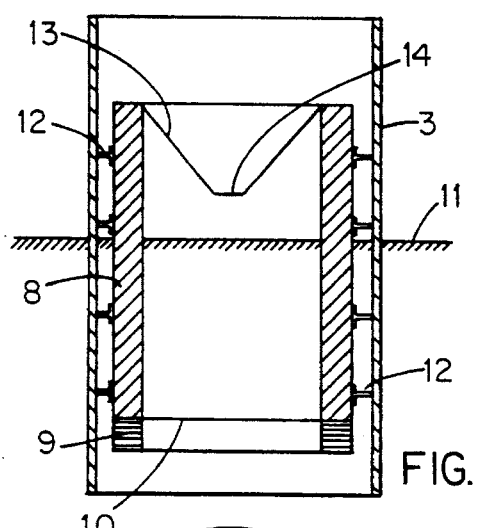
FIGS. 2A and 2B show a longitudinal section of a storage tank and a cross-section thereof.
Figure 2B:
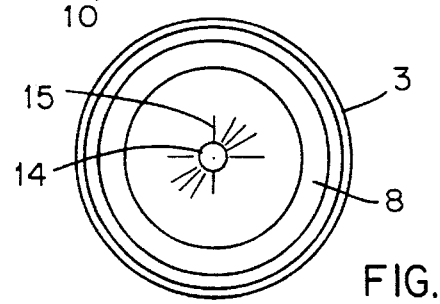

The device as shown in FIGS. 2A and 2B comprises a floating body in the form of pipe 8 made from cellular plastic with a lower ballast 9 around a lower opening 10. The floating body floats in the product in tank product surface 11. A number of annular flexible seals 12 are provided around the pipe 8 with internal spacing to seal pipe 8 against the stillpipe 3. A conical plastic cap 13 with a central relatively small opening 14 covers the upper part of pipe 8. The cap 13 may be provided with narrow radial slots 15 going out from its center to allow for manual gauging. The slits 15 reduce the evaporation from the product surface within the floating body.

Figure 3:
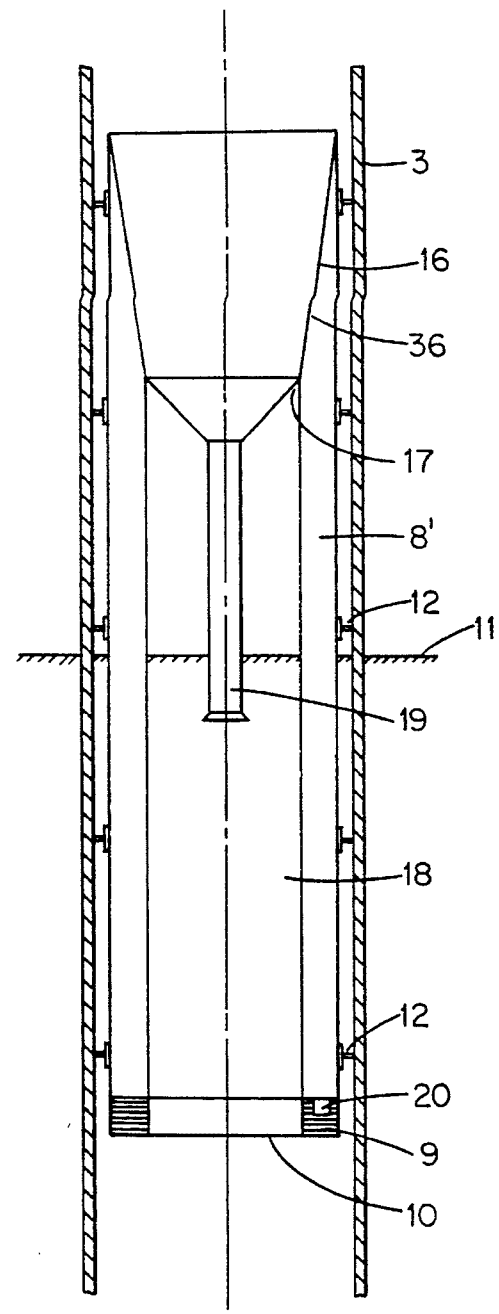
FIG. 3 shows a schematic diagram of a longitudinal section of an alternative embodiment of the invention.

FIG. 3 illustrates an alternative embodiment of a device according to the invention with a cap in the form of a plastic funnel 16 attached to a pipe 36 in its upper conical formed end which fits the plastic funnel 16. A snap-in closure 17 which is not completely gas-tight keeps the plastic funnel 16 attached to the pipe 36 forming a connection between the interior 18 of the floating body and the atmosphere which levels out any difference in gas pressure. The pipe 36 is made from metal plate and the hollow interior 8' is filled with air. A valve 20 is provided in ballast 9 for reasons of manufacture. The plastic funnel 16 is provided with a spout 19 extending below the surface 11 of the product.

Figure 5:
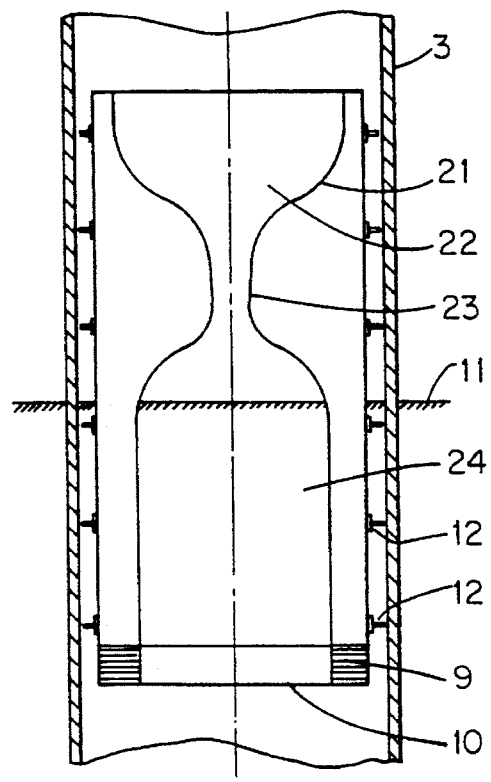
FIG. 5 schematically illustrates a longitudinal section of a further embodiment of the device of the invention.

In FIG. 5 there is shown an embodiment of the device wherein the floating body is made from metal plate and contains a hollow interior filled with air. The inside wall of the floating body is formed rotationally symmetrically and contains three sections. The three sections comprise an upper space 22 with a relatively large cross-section gradually tapering downwardly with continuous change to a central channel 23 with a relatively small cross-section and gradually downwardly enlarging to a lower space 24 with a relatively large cross-section.

The volume/weight relationship of the floating body causes it to float in the product. The floating body may also be constructed from plastic and may be filled with cellular plastic. The outer wall of the floating body may be provided with a number of annular seals 12 as previously described. The floating body may also be provided with a plastic cap, not shown, with a relatively small opening for equalizing the interior gas pressure in the lower space or channel 24 and the atmosphere.

Figure 4A:
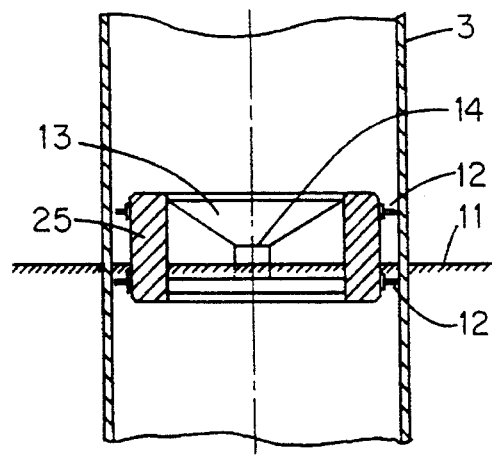
FIGS. 4A and 4B show a longitudinal section and a cross-section of an alternative embodiment of the invention.
Figure 4B:
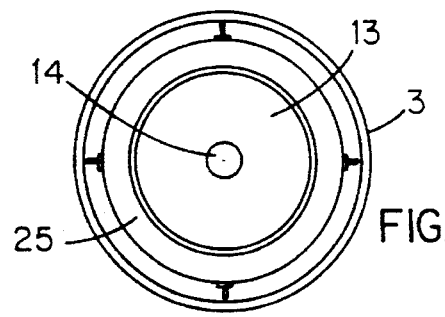

If there is a conical insert 7 in the stillpipe 3 as shown in FIG. 1, the device according to the invention may be designed in such a way as to permit deforming to an extent necessary to allow it to be introduced through the limited cross-section formed by the conical insert and then automatically regain its original dimensions. In such a deformable embodiment the floating body illustrated in FIGS. 4A and 4B comprises a flexible ring part 25 with outer flexible seal rings 12 and a flexible cap 13 with a central opening 14.

Figure 6:
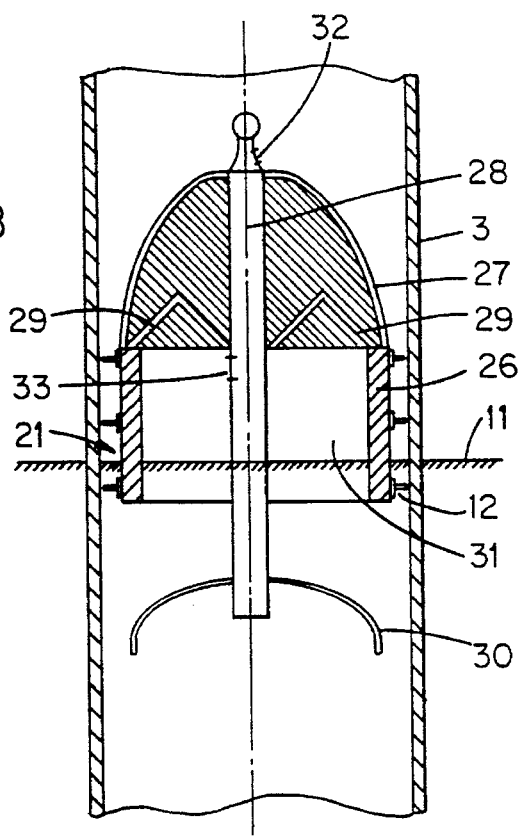
FIG. 6 schematically illustrates a further alternative embodiment of the device of the invention.

In the alternative embodiment of FIG. 6 the floating body 21 comprises a flexible ring part 26 with a cupola 27 of flexible material. A central frame 28 is provided with flexible links 29 connected to the ring part 26 and the cupola 27. At the lower part of frame 28 there are provided guide elements 30 for centering the device in the stillpipe 3. Frame 28 and flexible links 29 act as the corresponding means in a common umbrella. Thus the device may be folded together to a substantially smaller cross-section so that it may be inserted through a reduced cross-section in stillpipe 3 if necessary. A channel is provided between openings 32 and 33 in the central part of frame 28 for equalizing gas pressure in the inner chamber 31 of the floating body.

A further and preferred embodiment of the invention is shown in FIGS. 7 and 8 which illustrate two shapes for this embodiment. The floating body is comprised of an outer pipe 40 and 41 preferably of metal such as steel. Mounted on the outer surfaces of the pipes are spaced annular seals 42–45 & 46–49. The seals are preferably disposed at substantially equal spacings from one another and serve the same purpose as the seals previously described in connection with FIGS. 2A and 5. Four seals are illustrated and a number in excess of two is preferable. The float is sufficiently long and the seals sufficiently close to one another to effectively prevent gas flow from the surface of the liquid in the tank through the elongated holes 6.

Within the pipes are inserted funnels 50 and 51 having upper annular edges coinciding with the upper edges of the pipes. At the bottom ends the narrow portions of the funnels 50 and 51 are attached to bottom plates 52 and 53 attached to the pipe and the funnel to form openings or holes 54 and 55. The funnels thus have upper frustoconical portions connected to lower narrow and substantially cylindrical portions. The function of the sealing devices of FIGS. 8 and 9 is the same as described for the embodiments of FIGS. 2 and 5.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. In a tank for storing products that contain volatile substances, which tank is provided with a floating roof with a first opening designed to slide tightly along a vertical stillpipe having a plurality of second openings spaced along the stillpipe for communication between the products in the tank and the inside of the stillpipe; a device for reducing the flow of volatile substances from the inside of the stillpipe to the atmosphere through said second openings when such openings are located above the roof the improvement wherein said device comprises a floating body having an outside and an inside and outward sealing means on said outside for tightly engaging the inner circumference of the stillpipe, said sealing means extending in the direction of the axis of said stillpipe for a distance sufficient to seal an adjacent second opening against the flow of volatile substances therethrough, the volume/weight relationship of the floating body being selected such that the body will float in the product and contains within its inside an unbroken exposed product surface capable of reflecting microwaves above said contained product surface gas within the stillpipe to permit direct gauging of the product level with said floating body in a floating condition, wherein said reflecting surface at the time of gauging includes the axis of said vertical stillpipe and the immediately surrounding area which area of exposed reflecting product surface is unbroken, the inside of the floating body communicating with the product through at least one third opening and communicating through a fourth opening with the inside of the stillpipe above the floating body to allow the gas pressure in the inside of the floating body to be substantially the same as the gas pressure in the inside of the stillpipe above the floating body, the floating body comprising material that permits direct gauging of the product level with microwaves.

2. A device according to claim 1 wherein the floating body is substantially in the shape of a pipe, downwardly open through said third opening and on top provided with a cap which is penetrable by microwaves and which has a relatively small fourth opening.

3. A device according to claim 2 wherein said cap is shaped like a funnel.

4. A device according to claim 2 wherein said floating body is provided with a number of annular flexible seals arranged in spaced fashion around the outer circumference of its pipe-shaped outside.

5. A device according to claim 2 wherein said floating body is deformable and said cap consists of a cupola of flexible material, a central frame being provided connected to the floating body and to the cupola by flexible links, the frame being provided at its lower end with centering guide elements.

6. A device according to claim 1 wherein the floating body is deformable, automatically restorable to its original dimensions.

7. In a tank for storing products that contain volatile substances, which tank is provided with a floating roof with a first opening designed to slide tightly along a vertical stillpipe having a plurality of second openings spaced along the stillpipe for communication between the products in the tank and the inside of the stillpipe; a device for reducing the flow of volatile substances from the inside of the stillpipe to the atmosphere through said second openings when such openings are located above the roof the improvement wherein said device comprises a floating body having an outside and an inside and outward sealing means on said outside tightly for engaging the inner circumference of the stillpipe, the volume/weight relationship of the floating body being selected such that the body will float in the product and contains in its inside a portion of the product surface and above the portion of said product surface gas within the stillpipe, the inside of the floating body communicating with the product through at least one third opening and communicating through a fourth opening with the inside of the stillpipe above the floating body to allow the gas pressure in the inside of the floating body to be substantially the same as the gas pressure in the inside of the stillpipe above the floating body, the floating body comprising material that permits direct gauging of the product level with microwaves, said floating body being substantially in the shape of a pipe, downwardly open through said third opening and upwardly open through said fourth opening, said outward sealing means comprising said pipe being provided with a number of annular flexible seals arranged in spaced fashion around the outer circumference of its pipe-shaped outside, said floating body having mounted therein an elongated funnel shaped inner wall terminating at its upper end in said fourth opening and at its lower end in said third opening.

8. A device according to claim 7 in which said third opening is smaller than said fourth opening and wherein the lower end of said inner wall is joined to the lower end of the outer circumference of said floating body by a bottom plate.

9. A device according to claim 1, the floating body comprising material that permits direct gauging of the product level with microwaves, said floating body being substantially in the shape of a pipe, downwardly open through said third opening and on top provided with a cap which is penetrable by microwaves and which has a relatively small fourth opening, said outward sealing means comprising said floating body being provided with a number of annular flexible seals arranged in spaced fashion around the outer circumference of its outside.

10. A device according to claim 9 wherein said floating body is deformable and said cap consists of a cupola of flexible material, a central frame being provided connected to the floating body and to the cupola by flexible links, the frame being provided at its lower end with centering guide elements.

11. In a tank for storing products that contain volatile substances, which tank is provided with a floating roof with a first opening designed to slide tightly along a vertical stillpipe having a plurality of second openings spaced along the stillpipe for communication between the products in the tank and the inside of the stillpipe; a device for reducing the flow of volatile substances from the inside of the stillpipe to the atmosphere through said second openings when such openings are located above the roof the improvement wherein said device comprises a floating body having an outside and an inside and outward sealing means on said outside for tightly engaging the inner circumference of the stillpipe, said sealing means extending in the direction of the axis of said stillpipe for a distance sufficient to seal an adjacent second opening against the flow of volatile substances therethrough the volume/weight relationship of the floating body being selected such that the body will float in the product and contains in its inside an unbroken exposed product surface capable of reflecting microwaves above said contained product surface gas within the stillpipe to permit direct gauging of the product level, the inside of the floating body communicating with the product through at least one third opening and communicating through a fourth opening with the inside of the stillpipe above the floating body to allow the gas pressure in the inside of the floating body to be substantially the same as the gas pressure in the inside of the stillpipe above the floating body, the floating body comprising material that permits direct gauging of the product level with microwaves, said floating body being substantially in the shape of a pipe, downwardly open through said third opening, said inside of said floating body having an inner construction forming a substantially central channel having a cross-section smaller than said third opening, the floating body being arranged in such a way that when floating in said product the product surface is exposed below said channel.

* * * * *